United States Patent
Farrokh et al.

[19]

[11] Patent Number: 6,108,375
[45] Date of Patent: Aug. 22, 2000

[54] EQUALIZATION CIRCUIT FOR UNKNOWN QAM CONSTELLATION SIZE

[75] Inventors: Hashem Farrokh, Schnecksville, Pa.; Subramanian Naganathan, Monmouth Junction; Kalavai Janardhan Raghunath, Chatham, both of N.J.; Marta M. Rambaud, Allentown, Pa.

[73] Assignee: Lucent Technologies Inc., Murray Hill, N.J.

[21] Appl. No.: 08/993,465

[22] Filed: Dec. 18, 1997

Related U.S. Application Data

[60] Provisional application No. 60/052,571, Jul. 15, 1997.

[51] Int. Cl.$^7$ ........................................... H04L 5/04
[52] U.S. Cl. ........................... 375/235; 375/266; 375/324; 375/332; 375/345
[58] Field of Search ................................. 375/235, 266, 375/324, 332, 345

[56] References Cited

U.S. PATENT DOCUMENTS 5,381,450  1/1995  Lane ........................................... 375/94
5,742,643  4/1998  Reeves et al. ........................... 375/243

OTHER PUBLICATIONS

IEEE Transactions on Communications, vol., Com–28, No. 11, Nov. 1980 "Self–Recovering Equalization and Carrier Tracking In Two–Dimensional Data Communication Systems", by Dominique N. Godard, Member, IEEE, pp. 1867–1875.

*Primary Examiner*—Amanda Le
*Attorney, Agent, or Firm*—John P. Veschi

[57] ABSTRACT

In a digital receiver, an equalizing unit includes a power controller adapted to scale received components of a quadrature amplitude modulated signal based on a constellation size of the quadrature amplitude modulated signal. Alternatively, a method of scaling components of a quadrature amplitude modulated signal includes the steps of searching the quadrature amplitude modulated signal to determine a constellation size, and scaling the components of the quadrature amplitude modulated signal based on the constellation size.

11 Claims, 1 Drawing Sheet

EQUALIZATION CIRCUIT FOR UNKNOWN QAM CONSTELLATION SIZE

Priority of U.S. Provisional application Ser. No. 60/052,571, filed Jul. 15, 1997, is hereby claimed.

This application is related to co-pending patent application Ser. No. 09/114,948 entitled "Variable Baudrate Demodulator," (Farrow 31-29-3-7-2), patent application No. 09/114,949, entitled "Fixed Clock Based Arbitrary Symbol Rate Timing Recovery Loop," (Marandi 2-30-4-1), patent application Ser. No. 09/019,320, 60/056,695 entitled "Amplitude Based Coarse AGC," (Marandi 1-31-5-3), and patent application Ser. No. 09/019,402, entitled "Power Based Digital Automatic Gain Control Circuit," (Mobin 32-4), each co-filed herewith and incorporated herein by reference.

BACKGROUND OF THE INVENTION

Blind equalization used during the receipt of quadrature amplitude modulated (QAM) signals is described by Godard in his paper entitled "Self-Recovering Equalization and Carrier Tracking in Two-Dimensional Data Communication Systems," IEEE Transactions on Communications, vol. com-28, no. 11, November, 1980, incorporated herein by reference. The purpose of equalization is to clean up a signal to remove any effects of a channel carrying the signal. Typically, equalization can be accomplished by transmitting known training data through the channel, comparing the received signal to the known training data to determine the channel effects, and then compensating for the channel effects on later received signals. When training data is not available, an alternative approach, known as "blind" equalization, is employed. Godard's approach to blind equalization is complicated and expensive to implement, and a simpler, less expensive approach to blind equalization is needed.

SUMMARY OF THE INVENTION

In a digital receiver, an equalizing unit includes a power controller adapted to scale received components of a quadrature amplitude modulated signal based on a constellation size of the quadrature amplitude modulated signal.

Alternatively, a method of scaling components of a quadrature amplitude modulated signal includes the steps of searching the quadrature amplitude modulated signal to determine a constellation size, and scaling the components of the quadrature amplitude modulated signal based on the constellation size.

BRIEF DESCRIPTION OF THE DRAWING(S)

FIG. 1 shows a first embodiment of an equalizing unit according to the invention; and FIG. 2 shows a second embodiment of an equalizing unit according to the invention.

DETAILED DESCRIPTION

Figure 1:
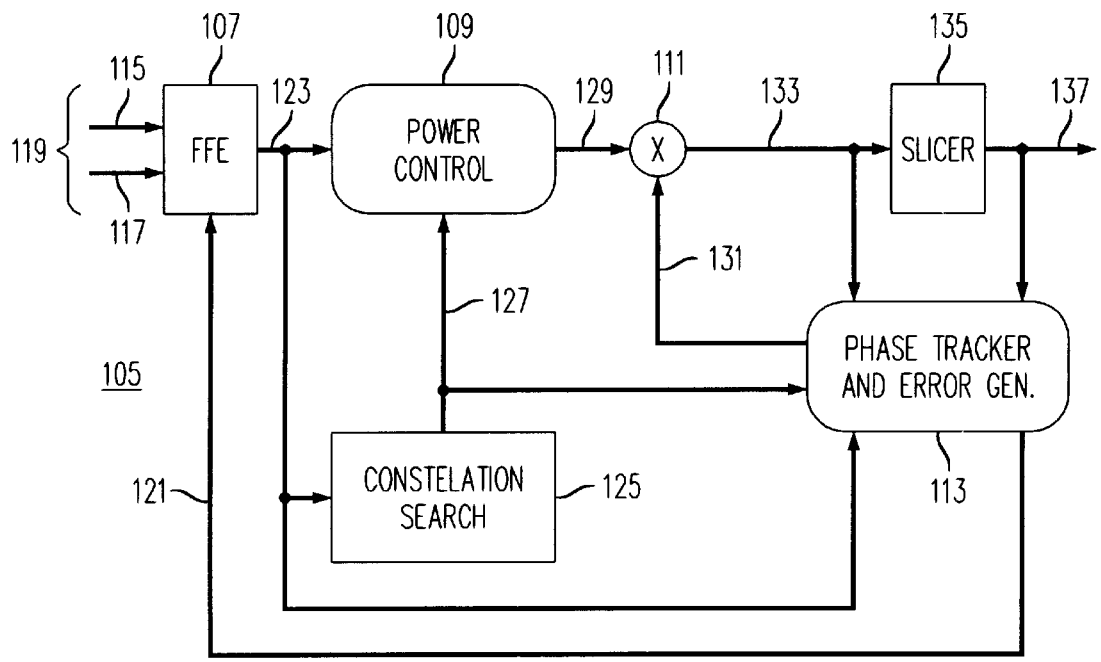

In one embodiment of the invention, an equalizing unit 105 shown in FIG. 1 includes a feed-forward equalizer 107, a power controller 109, a complex multiplier 111, and a combination phase tracker and error generator 113. Feed-forward equalizer 107 receives input 119 having an in-phase component 115 and a quadrature component 117. Feed-forward equalizer 107 also receives error signal 121 which includes a one-bit in-phase error signal and a one-bit quadrature error signal. Feed-forward equalizer 107 produces equalized signal 123 (also referred to as "FFE output"), including an equalized in-phase component, referred to as $FFE_I$ and an equalized quadrature component, referred to as $FFE_Q$.

Equalizing unit 105 also includes constellation search engine 125. Constellation search engine 125 receives the FFE output 123 and produces a constellation size indication signal 127. Power controller 109 receives equalized signal 123 and adjusts the average power of equalized signal 123 according to the constellation size indicated by constellation size indication signal 127. Power controller 109 first measures the average input power of a plurality of samples, and scales the magnitude of the equalized signal, and hence the average power of the equalized signal, based on the constellation size. The output of power controller 109 is referred to as a power adjusted signal 129, which includes a power adjusted in-phase component and a power adjusted quadrature component.

Complex multiplier 111 receives power adjusted signal 129 from power controller 109. Complex multiplier 111 also receives phase tracking information 131 from phase tracker and error generator 113. Phase tracking information 131 can include, for example, sine values and cosine values used by complex multiplier 111 to create phase adjusted signal 133, which includes a phase adjusted in-phase component and a phase adjusted quadrature component. The operation of complex multiplier 111 is conventional, and is described, for example in *Data Communication Principles,* by Richard Gitlin, J. F. Hayes, and S. B. Weinstein, published by Plenum Press in 1994, and incorporated herein by reference. Sine and cosine values included in the phase tracking information 131 can be obtained from a sine/cosine lookup table in phase tracker and error generator 113. Such a lookup table can be, for example, a lookup table described in co-pending application Ser. No. 08/885,150, U.S. Pat. No. 5,937,438, entitled "Sine/Cosine Look-up Table," (Raghunath 8-1) incorporated herein by reference.

According to the invention, phase tracker and error generator 113 also creates error signal 121 which includes the one-bit in-phase error signal and the one-bit quadrature error signal used by feed-forward equalizer 107. Equalizer 105 may also include slicer 135 which is adapted to receive frequency adjusted signal 133 and produce truncated signal 137. Truncated signal 137 includes a truncated in-phase component and a truncated quadrature component. When slicer 135 is included in equalizer 105, truncated signal 137 serves as an output signal of equalizing unit 105. In an embodiment that does not include slicer 135, frequency adjusted signal 133 serves as the output signal of equalizing unit 105.

Phase tracker and error generator 113 receives at least one of frequency adjusted signal 133 and truncated signal 137. Phase tracker and error generator 113 also receives the $FFE_I$ and $FFE_Q$ components of FFE output 123 and calculates the one-bit in-phase error signal and the one-bit quadrature error signal, which are provided as components of error signal 121 to feed forward equalizer 107. Phase tracker and error generator 113 receives the constellation size indication signal 127 and determines a CMA constant value based thereon. The CMA constant value, $CMA_{CONSTANT}$, which is known to one of ordinary skill in the art, is looked up in a corresponding look up table, or is calculated in a known manner. These constants are described, for example, in the aforementioned text *Data Communication Principles,* by Gitlin et. al. Phase tracker and error generator 113 computes a CMA_error value according to the following equation $$CMA\_error = CMA_{CONSTANT} - (FFE_I)^2 - (FFE_Q)^2.$$

The sign bit of the CMA_error value is then exclusive-ORed with the sign bit of $FFE_I$ to create the one-bit in-phase component of error signal 121, and is exclusive-ORed with the sign bit of $FFE_Q$ to create the one-bit quadrature component of error signal 121. These components of error signal 121 are then provided to feed-forward equalizer 107.

Conventional equalizers, such as that developed by Godard and described in his paper, are significantly more complex than equalizer 105. For example, in Godard's equalizer, the in-phase error signal and the quadrature error signal are each multibit signals, such as, for example, 12–16 bit signals. Further, conventional equalizers such as Godard's operate on an entire multibit error signal and on an entire in-phase component and quadrature component. In the system according to the invention, on the other hand, only the sign bit is operated on. Thus, the equalizer of the present invention is significantly simpler and thus significantly more robust. For example, as discussed above, phase tracker and error generator 113 computes the error signals via exclusive-OR operations. Conventional equalizers, on the other hand, require multibit multiplication operations, which are more complex than exclusive-OR operations, to compute error signals.

Another improvement in the present invention when compared to conventional equalizers is the use of power controller 109 to produce power adjusted signal 129. Conventional equalizers do not include a power controller, such as power controller 109, and further do not include a constellation search engine, such as constellation search engine 125. According to the invention, constellation search engine 125 receives equalized signal 123 and produces constellation size indication signal 127. Power controller 109, based on constellation size indication signal 127, produces power adjusted signal 129 from equalized signal 123. Conventional equalizers, on the other hand, do not allow for the adjustment of power level based on the constellation size.

Constellation search engine 125 initiates a constellation search by presuming a first constellation size, such as a four level constellation. Constellation search engine 125 then waits for a predetermined settling time, such as, for example, 200,000 samples, and then determines if a signal to noise ratio (SNR) based on the assumption of a four level constellation, is greater than or equal to a first threshold. If the SNR is greater than or equal to the first threshold, constellation search engine 125 locks in the constellation size as a four level constellation. If the SNR is less than the first threshold, then the constellation search engine presumes a next higher constellation size and determines, after settling, if the resulting SNR is greater than or equal to a second threshold. The constellation search engine continues in this manner until finding a constellation size for which the SNR, after settling, is greater than or equal to a corresponding threshold.

For example, presume the first threshold is set for a four level constellation. After settling, constellation search engine 125 calculates the SNR based on the assumption of a four level constellation, and then determines if the calculated SNR is greater than or equal to a first threshold corresponding to a four level constellation size. An example of a first threshold is 12dB. If the SNR calculated based on the assumption that there is a four level constellation is greater than or equal to 12dB, after settling, then constellation search engine 125 provides constellation size indication signal 127 to power controller 109 and phase tracker and error generator 113 indicating that the constellation is a four level constellation.

If, however, the SNR calculated based on the assumption of a four level constellation is less than 12dB, then constellation search engine 125 presumes, for example, an eight level constellation. After settling, constellation search engine 125 calculates an SNR based on the assumption of an eight level constellation, and then determines if the SNR is greater than or equal to a second threshold corresponding to an eight level constellation. The second threshold can be, for example, 16dB. In such a case, if the SNR is greater than or equal to 16dB, constellation search engine 125 produces constellation size indication signal 127 to inform power controller 109 and phase tracker and error generator 113 that the constellation is an eight level constellation. However, if the SNR is less than 16dB, constellation search engine 125 next presumes, for example, a sixteen level constellation. After settling, constellation search engine 125 calculates an SNR based on the assumption that the constellation has 16 levels, and then determines if the SNR is greater than or equal to a third threshold of, for example, 19dB. If so, constellation search engine 125 outputs constellation size indication signal 127 to inform power controller 109 and phase tracker and error generator 113 that the constellation is a sixteen level constellation. If, on the other hand, the 16-level SNR is less than 19dB, constellation search engine 125 presumes a constellation size of 32. If, after settling, an SNR calculated for a 32-level constellation is greater than or equal to a fourth threshold, such as, for example, 21dB, then constellation search engine 125 outputs constellation size indication signal 127 to inform power controller 109 and phase tracker and error generator 113 that the constellation is a thirty-two level constellation.

Constellation search engine 125 continues in this manner until, after settling, the SNR calculated for a presumed constellation size is greater than or equal to a threshold corresponding to the presumed constellation size. For example, a sixty-four level constellation can have a corresponding fifth threshold of 25dB, a 128-level constellation can have a corresponding sixth threshold of, for example, 28dB, and a 256-level constellation can have a seventh threshold of, for example, 31dB Power controller 109 produces power adjusted signal 129 from equalized signal 123 based on the size indicated in constellation size indication signal 127.

Power controller 109 operates by first determining a target power level based on the constellation size. The target power level selected for a given constellation size is a function of the spacing between data levels in the constellation, and can be either calculated or retrieved from a corresponding register. Various power levels that are candidates for the target power levels are known to one of ordinary skill in the art. After determining the target power level corresponding to the constellation size indicated by the constellation size indication signal 127, power controller 109 adjusts the power level of equalized signal 123 to produce power adjusted signal 129 through, for example, a conventional feedback process that causes the power level of power adjusted signal 129 to approach the target power level.

Figure 2:
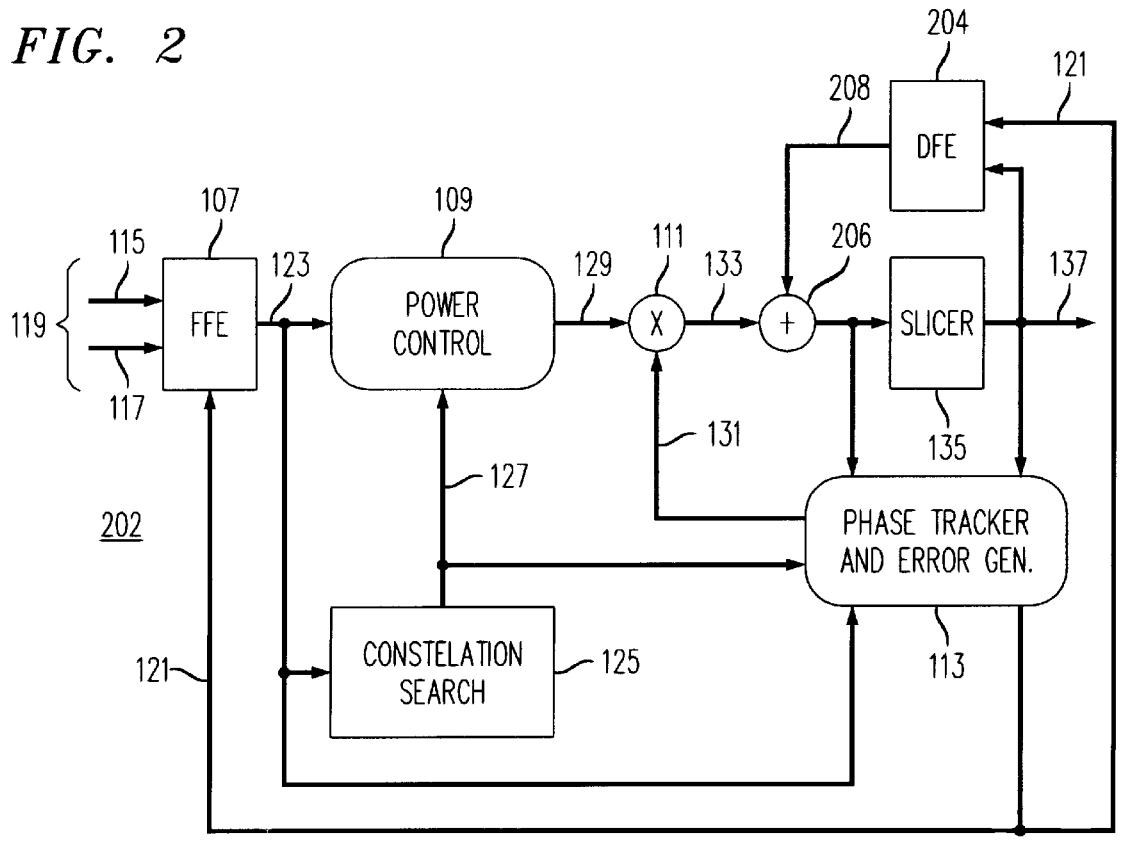

In an alternative embodiment, equalizing unit 202, shown in FIG. 2, includes all the elements of equalizing unit 105, and also includes decision feedback equalizer 204 and summer 206. Decision feedback equalizer 204 receives error signal 121 and truncated signal 137. Decision feedback equalizer 204 provides feedback signal 208 to summer 206. Feedback signal 208 includes an in-phase feedback signal and a quadrature feedback signal. Summer 206 receives frequency adjusted signal 133 and sums the frequency adjusted components of frequency adjusted signal 133 with the corresponding in-phase feedback signal and quadrature feedback signal of feedback signal 208 to fine tune the frequency adjusted components prior to the input of the frequency adjusted components to slicer 135.

Two exemplary embodiments of an equalizing unit according to the invention have been described. An advantage of these equalizing units is the simplified error generator which can employ exclusive-OR gates in place of conventionally used multipliers. Another advantage is that power controller 109, placed downstream of feed-forward equalizer 107, allows for constellation search engine 125 to perform a constellation search without providing feedback to feed-forward equalizer 107. Thus, once feed-forward equalizer 107 converges, it need not converge again for a different size constellation.

An additional advantage of the above-described architecture is that power controller 109, in controlling power according to constellation size, can compensate for an incorrect CMA error value employed in phase tracker and error generator 113. In a conventional system, each time the constellation size changes, a new CMA error value must be established and a new convergence procedure must be completed. In the present system, on the other hand, when the constellation size changes, the CMA error value can remain fixed, thereby eliminating the need for a new convergence, with the fact that the CMA error value is not updated being compensated for by an update in the target power level used by power controller 109.

What is claimed is:

1. In a digital receiver, an equalizing unit including a power controller adapted to scale received components of a quadrature amplitude modulated signal based on a constellation size of the quadrature amplitude modulated signal.

2. An equalizing unit as recited in claim 1, further comprising a constellation search engine adapted to receive the quadrature amplitude modulated signal and provide a constellation size indication signal to the power controller.

3. An equalizing unit as recited in claim 2, wherein the constellation search engine is adapted to perform a constellation search of the received quadrature amplitude modulated signal to determine the constellation size.

4. In a digital receiver, an equalizing unit, comprising:
   a feed forward equalizer adapted to receive a quadrature amplitude modulated signal, and to output an equalized in-phase component and an equalized quadrature component;
   a constellation search engine adapted to receive the equalized in-phase component and the equalized quadrature component and produce a constellation size indication signal;
   a power controller adapted to receive the constellation size indication signal, the equalized in-phase component and the equalized quadrature component, and to output a corresponding power adjusted in-phase component and a power adjusted quadrature component, the power level thereof adjusted in accordance with the constellation size indication signal;
   a complex multiplier adapted to receive the power adjusted in-phase component and power adjusted quadrature component, and to produce a corresponding phase adjusted in-phase component and a phase adjusted quadrature component; and
   an error generator adapted to receive the equalized in-phase component, the equalized quadrature component, the phase adjusted in-phase component and the phase adjusted quadrature component and to produce a corresponding in-phase error signal and a corresponding quadrature error signal, the error signals being provided to the feed forward equalizer.

5. An equalizing unit as recited in claim 4, wherein the error generator is adapted to produce a one-bit in-phase error signal and a one-bit quadrature error signal as the error signals provided to the feed forward equalizer.

6. An equalizing unit as recited in claim 5, wherein the error generator computes the one-bit in-phase error signal via an exclusive-OR operation between a sign bit of the equalized in-phase component and a sign bit of a constant modulus algorithm (CLMA) error value.

7. An equalizing unit as recited in claim 6, wherein the error generator computes the one-bit quadrature error signal via an exclusive-OR operation between a sign bit of the equalized quadrature component and the sign bit of the CMA error value.

8. A method of scaling components of a quadrature amplitude modulated signal, comprising the steps of:
   searching the quadrature amplitude modulated signal to determine a constellation size; and
   scaling the components of the quadrature amplitude modulated signal based on the constellation size.

9. A method as recited in claim 8, wherein the searching step comprises the steps of:
   selecting a candidate constellation size;
   determining a signal to noise ratio of the quadrature amplitude modulated signal based on the candidate constellation size;
   locking in the candidate constellation size as the constellation size if the signal to noise ratio is greater than or equal to a threshold corresponding to the candidate constellation size; and
   returning, if the signal to noise ratio is less than the threshold, to the selecting step to select another candidate constellation size.

10. A method as recited in claim 9, wherein the selecting step initially selects a smallest possible constellation size, and subsequently selects successively larger constellation sizes.

11. A method as recited in claim 9, further comprising the step of waiting a predetermined settling time between the selecting step and the determining step.

* * * * *